United States Patent Office
3,472,356
Patented Oct. 14, 1969

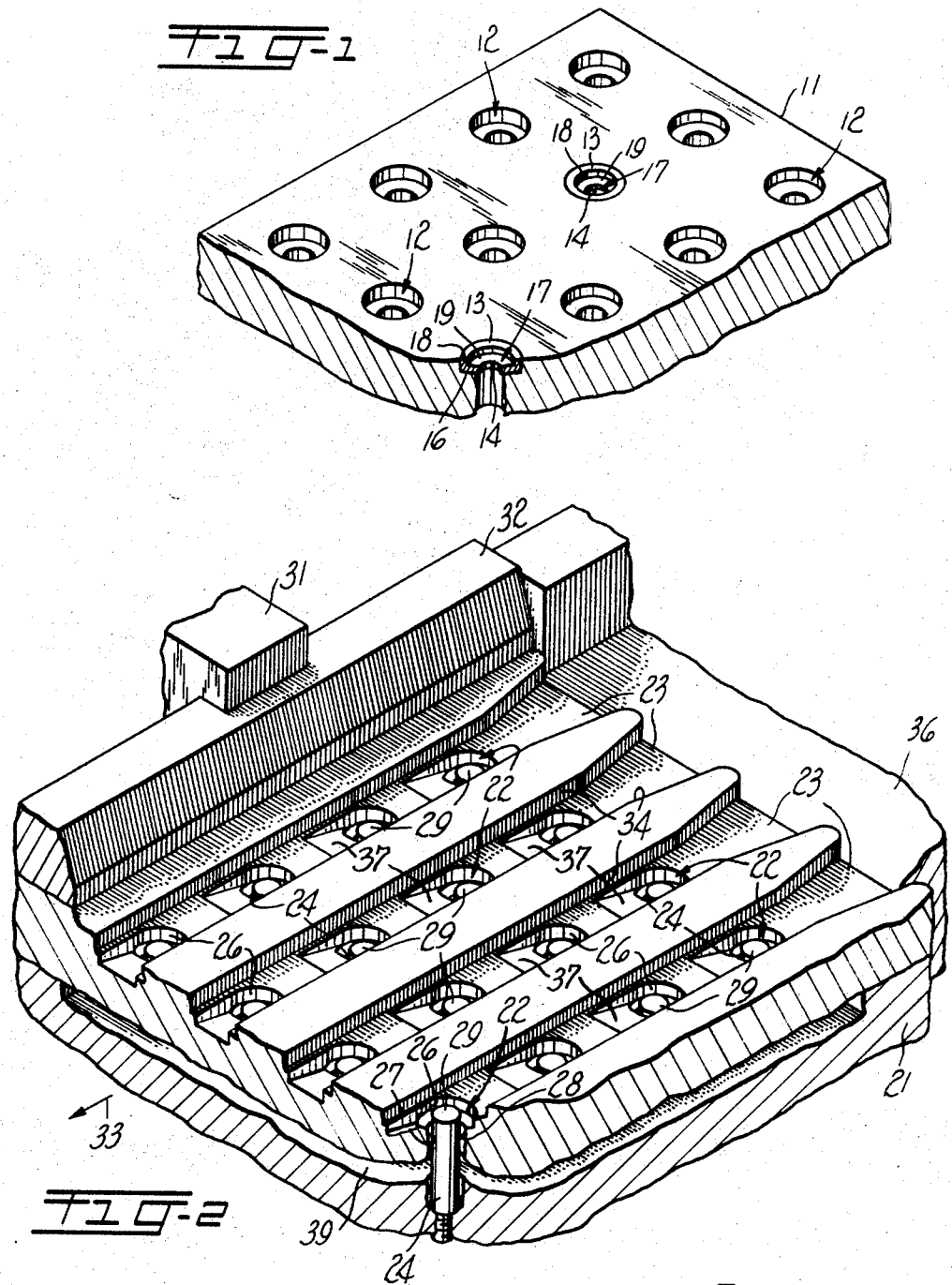

3,472,356
APPARATUS FOR SELECTING ARTICLES HAVING A DESIRED ORIENTATION
Miles N. Reppert, Shillington, Pa., assignor to Western Electric Company, Incorporated, New York, N.Y., a corporation of New York
Filed Feb. 28, 1968, Ser. No. 708,895
Int. Cl. B07b 3/04; B66c 1/02
U.S. Cl. 198—33     4 Claims

ABSTRACT OF THE DISCLOSURE

A plate includes several channels with cavities spaced along the bottom of each channel. A pin extends upwardly in each cavity. A succession of randomly oriented, cup-shaped articles is advanced by vibratory energy along the channels. Only those cup-shaped articles with downwardly facing mouths seat on the pins in the cavities. Vacuum is applied to hold the seated articles. The plate when fully loaded is inverted over a fixture and the vacuum holding force is released whereupon the articles drop from the cavities into aligned nests in the fixture with the mouths of the articles facing upwardly.

BACKGROUND OF THE INVENTION

This invention relates to apparatus for selecting articles with a desired orientation from a group of randomly oriented articles and, more particularly, to apparatus for so selecting articles and transferring the selected articles to a receiving fixture.

In the loading of articles into a fixture for subsequent treatment, it is often necessary that all of the articles assume a desired orientation in respective article receiving nests in the fixture. Referring to cup-shaped articles in particular, it may be required that each such article be loaded into a nest in the fixture with the mouth of the cup-shaped article facing upwardly.

In order that all of the articles have this desired orientation, it is possible to introduce correctly oriented articles manually into each of the nests. However, such operation is obviously time-consuming and costly. Thus, it is desirable to provide automatic apparatus operable to select rapidly a large number of similarly oriented articles for subsequent transfer into the fixture with the required orientation.

SUMMARY OF THE INVENTION

The invention contemplates the provision of apparatus of the type described above, wherein randomly oriented, cup-shaped articles are advanced in rapid succession across a series of cavities at the bottom of several channels extending along an article support. Article receiving pockets formed in the cavities are of such shape and size that only those articles with mouths facing downwardly can seat within the cavities. The channels serve to guide the advancing articles across the cavities to be filled. Filling of the cavities allows the transfer of the seated articles into aligned nests in a receiving fixture, with the mouths of the articles facing upwardly, by inversion of the article support over the fixture.

In order that the article support may be inverted over the fixture with the seated articles not falling prematurely out of the cavities, it is necessary that a mechanism be provided for holding the articles temporarily in place in the cavities during such inversion. The invention, thus, further contemplates the provision of a retaining mechanism of this type. The retaining mechanism cooperates with the article seating mechanism provided by the article receiving pockets, taking advantage of the relationship between the shape and size of the pockets and that of the articles. When seated in a pocket, a correctly oriented article substantially fills the pocket and acts substantially as a fluid seal between the surrounding atmosphere and a passageway formed within the cavity beneath the article. A source of fluid having pressure lower than that of the surrounding atmosphere is connectable to the passageway. As a result, a pressure differential may be introduced across the seated article to hold the article in position while the article support is inverted and aligned above the fixture. The passageway is then connectable to the surrounding atmosphere to release the article by introducing equal fluid pressures across opposed faces of the article so that the article will drop into a nest in the fixture.

Apparatus constructed in accordance with the invention provides a simple, yet reliable mechanism for rapid selection of cup-shaped articles with downwardly facing mouths. The apparatus is then operable to invert the articles above aligned nests in a fixture for transferring the articles into the nests with the mouths of the articles facing upwardly.

BRIEF DESCRIPTION OF THE DRAWING

FIG. 1 is an isometric view of a portion of an article receiving fixture, showing a number of nests in the fixture for receiving cup-shaped articles with upwardly opening mouths, such as the exemplary articles illustrated in two of the nests;

FIG. 2 is an isometric view of a portion of an article supporting plate constructed in accordance with the invention, showing a number of cavities in the plate for seating therein only articles with downwardly opening mouths for subsequent transfer into the nests of the fixture of FIG. 1 with the plate inverted over the fixture;

DETAILED DESCRIPTION

Figure 3:
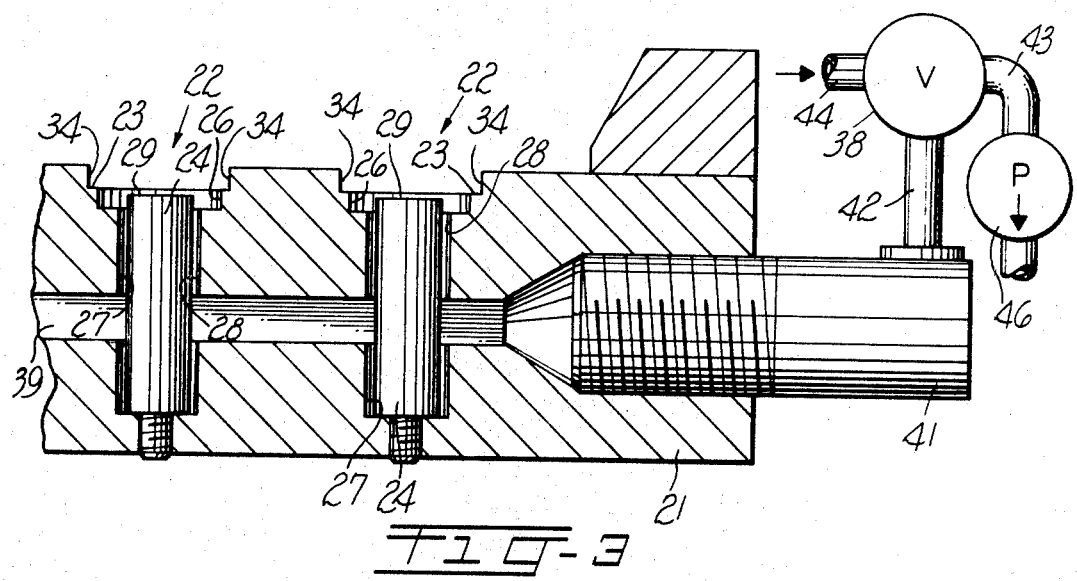
FIG. 3 is an enlarged sectional view of a portion of the article supporting plate looking from an end of the apparatus, showing two cavities in the plate and a pin projecting upwardly in each of the cavities.

Referring first to FIG. 1 of the drawing, a fixture 11 has located therein a number of recessed nests 12 arrayed in rows. It is desired that all of the nests 12 be filled with generally cup-shaped articles 13 which are to undergo a subsequent brazing or other operation. Two such articles 13, which may be cup-shaped washers having circular central openings 14 therethrough, are shown in nests 12 in FIG. 1 for purposes of illustration. It is to be understood, however, that all of the nests 12 in the fixture 11 are to be filled with cup-shaped articles.

Each cup-shaped article 13 has a substantially flat surface 16 on an opposite side thereof from a recessed mouth 17 of the cup. The mouth 17 is defined by a surrounding circular, rim-like outer wall or lip 18 extending perpendicularly to a central base portion 19 which constitutes a generally closed end of the cup-shaped article 13. The mouth 17 opens away from the base 19 and the flat surface 16. The base 19 has the circular central opening 14 extending therethrough if the article 13 is a cup-shaped washer. As shown in FIG. 1, it is desired that each article 13 be located in a nest 12 with the mouth 17 of the article facing generally upwardly.

Figure 4:
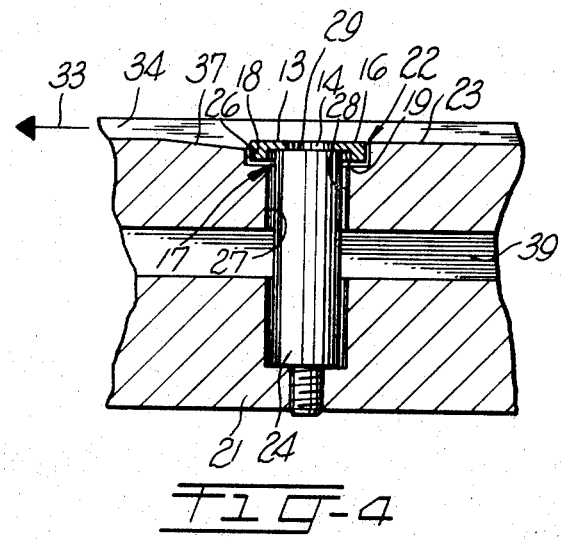
FIG. 4 is an enlarged sectional view of a portion of the article supporting plate looking from a side of the apparatus, illustrating a cup-shaped article seated in a cavity on a pin projecting upwardly therein, the article having a downwardly facing mouth.

A portion of an article supporting base plate 21, cooperative with the fixture 11 for transferring properly oriented articles 13 into the fixture nests 12, is shown in FIGS. 2–4. The plate 21 includes a number of circular shaped cavities 22 which extend downwardly therein beneath the bottom surfaces or floors of several longitudinally extending channels or guideways 23. The cavities 22 in the plate 21 are spaced along the channels 23 so as to be arrayed in rows in similar manner to the nests 12 in the fixture 11. The positioning of the cavities is such that, upon inverting the plate over the fixture, each cavity 22 is positioned directly above a nest 12. The cavities 22 provide pockets wherein appropriately oriented articles 13 are to be seated and retained. Upon retention of an article in each cavity 22, the plate 21 is to be inverted over the fixture 11 in order to drop the articles into the nests 12 with the mouths 17 facing upwardly. Thus, it is clear that the mouths 17 of cup-shaped articles 13 seated in the cavities 22 must face downwardly prior to such inversion of the plate 21.

Located within each cavity 22 is an upwardly extending pin or rod 24 for seating and retaining thereon, within the cavity, a cup-shaped article 13 with its mouth 17 facing downwardly, as shown in FIG. 4. Each cavity 22 includes a circular recess 26, having a diameter only slightly larger than the outer diameter of an article 13, the recess forming an upper portion of the cavity. Each cavity 22 also includes a circular bore or aperture 27 located beneath the circular recess 26. The diameter of the aperture 27 is substantially less than the outer diameter of an article 13, but somewhat larger than that of the pin 24. Thus, an annular passageway 28 is defined between a vertical circular wall bounding each aperture 27 and the pin 24 surrounded thereby. The depth to which each circular recess 26 extends beneath the floor of a channel 23 is equal to or only slightly greater than the height of the vertical outer wall 18 of an article 13. Each pin 24 extends upwardly to terminate with a top surface 29 thereof located beneath the level of the floor of a channel 23 by an amount substantially equal to or only slightly greater than the thickness of the central base portion 19 of an article 13. Each pin 24 has an outer diameter somewhat smaller than the inner diameter of the outer wall portion 18 of an article 13, but larger than any aperture 14 in an article. Thus, a correctly oriented cup-shaped article 13 may seat and be retained on a pin 24, as shown in FIG. 4, with the mouth 17 of the article facing downwardly and the outer wall 18 of the article surrounding an upper portion of the pin 24. On the other hand, an incorrectly oriented article 13 with the mouth 17 thereof facing upwardly will rest with the flat surface 16 of the article on the top surface 29 of the pin 24, in an unseated, non-retained position, free to move radially off of the pin. It will be clear that the circular recess 26 constituting an upper portion of each cavity 22 defines with the pin 24 extending upwardly therein a pocket for selecting by seating and retaining therein only a correctly oriented article 13 with a downwardly opening mouth. Each such pocket has the general shape of a correctly oriented article 13 and is only very slightly larger than the correctly oriented article. Thus, the pocket is substantially completely occupied by such article when seated therein. The article so seated acts substantially as a fluid seal between the annular passageway 28 beneath the pocket and the atmosphere thereabove.

Part of a plate vibrating mechanism 31 is shown in FIG. 2. The mechanism 31 is a conventional vibratory feed device which engages portions of the plate 21, for example along a shoulder 32, to vibrate the plate. Vibration of the plate 21 will cause a series of randomly oriented articles 13 to advance along each of the channels 23 in rapid succession, such as in a forward direction shown by the arrow 33 in FIGS. 2 and 4. The plate 21 preferably is tilted slightly downwardly in the direction of the arrow 33 to assist in moving the articles in this forward direction. Upwardly extending side walls 34 of the channels or guideways 23 serve to confine articles 13 therebetween and thereby to guide the advanced articles successively across the cavities 22. A group of randomly oriented articles 13 may be dropped, for example by hand, onto a rearwardmost portion of each channel 23 so as to be advanced therefrom. Preferably, however, a flat or slightly tilted loading platform 36, vibrated with vibration of the plate 21, constitutes a reservoir for vibratory feeding of randomly oriented articles into the channels 23.

As shown in FIG. 4, at a forward or downstream end of each cavity 22, i.e., downstream in the direction of movement of the articles 13 shown by the arrow 33, the floor of the channel 23 is recessed slightly to form an exit slope 37. The exit slope 37 extends upwardly and forwardly from the circular recess portion 26 of the cavity 22, beginning at a position slightly below or at the same level as the top surface 29 of the pin 24 in the cavity 22. The exit slope rises toward the floor of the channel 23 at a slight angle, typically an angle of the order of five degrees to the channel floor. The exit slope 37 intersects with the floor of the channel rearwardly of an adjacent downstream cavity 22 (not depicted in FIG. 4).

The annular passageways 28 between the pins 24 and the boundary walls of apertures 27 are all connected in fluid communication with a valve 38 (FIG. 3) in conventional manner, such as through a hollow area 39 in the plate 21, a fluid coupling 41, and a conduit 42. The valve 38 is operable, for example manually, to connect the annular passageways 28 selectively with a fluid line 43 or a fluid line 44. The line 43 is connected to a suitable source of fluid at a reduced or subatmospheric pressure, i.e., a source of fluid at a pressure below ambient fluid pressure, such as a suction pump 46. The line 44 opens to the surrounding atmosphere.

In describing the operation of the apparatus, reference is made initially to FIGS. 2–4 of the drawing. Cup-shaped articles 13 are loaded with random orientation onto the platform 36 and vibration of the mechanism 31 is commenced. The vibratory energy causes the articles to enter the channels 23. The articles advance in rapid succession between the side walls 34 in the direction of the arrow 33 as an article selecting operation begins. During this operation, the annular passageways 28 are preferably connected through the valve 38 to the line 43 which is coupled to the source 46 of reduced pressure.

A first article 13 in a channel 23 advances over a rearwardmost cavity 22 and onto the pin 24 therein. Assuming that the article is correctly oriented, i.e., with the mouth 17 thereof facing downwardly, the article 13 will drop into the cavity 22 to seat therein in the position shown in FIG. 4. The article is partially retained in the cavity 22 by a portion of the article, namely the outer wall 18 thereof, extending downwardly to surround the upper part of the pin 24 within the circular recess 26. The article will be seated on the pin 24 and be sufficiently retained thereon such that ordinarily vibration may continue without disturbing the retention provided by such seating. However, a more positive retention is assured if, as is preferred, the source 46 of fluid at reduced pressure (e.g., vacuum) is presently connected through the fluid line 43 and the valve 38 to the annular passageway 28 beneath the article 13. Thus, pressure differential across the article holds the article tightly against the pin 24. The outer wall 18 of the article substantially fills the recess 26 to substantially fluid seal the annular passageway 28 from the surrounding atmosphere, due to the shape and size of the pocket formed between the walls of the recess 26 and the pin 24, as explained above. This fluid seal maintains a suitable pressure differential across the seated article even with only a moderately reduced pressure provided by the source.

A second article 13 now is advanced over the rearwardmost cavity 22 wherein the correctly oriented first article 13 is retained. The flat surface 16 of the first article in the cavity 22 is now substantially level with or only slightly below the floor of the channel 23. Moreover, the seated first article substantially covers the entire cavity 22. Thus, the second article continues its advance, moving along the unblocked channel 23 by passing across this rearwardmost cavity 22 with the first article retained therein, no matter what the orientation of the second article 13 may be.

Assuming now that the first article 13 was not correctly oriented, i.e., that the mouth 17 thereof opened facing upwardly, the first article would not have seated and been retained in the rearwardmost cavity 22. Instead, the flat surface 16 of the article 13 would have dropped slightly into the topmost portion of the circular recess 26 to rest upon the top surface 29 of the pin 24 in an unseated, non-retention position. No portion of the article would have surrounded the topmost portion of the pin 24 within the circular recess 26 to serve as a retainer for the article 13 and as a fluid seal substantially to block off the annular passageway 28 from the surrounding atmosphere. Further, it will be noted that with the flat surface 16 of the article 13 resting on the top surface 29 of a pin 24, there would have been a relatively large gap between the leading edge of the article and the top surface of the exit slope 37, thereby precluding the applied vacuum from acting to hold the article on the pin. Thus, continued vibration would have advanced the incorrectly oriented article 13 along the slightly inclined exit slope 37 to move completely out of the circular recess 26 and along the channel 23.

The incorrectly oriented first article 13 would likewise have advanced across all of the cavities 22 in the channel 23 and would ultimately have fallen off of a forwardmost end (not shown) of the plate 21. Should the article 13 have been rolling on its edge, the article would obviously have traversed all of the cavities 22 on the tops of pins 24 therein, similarly falling ultimately off of the forwardmost end of the plate 21. Such incorrectly oriented articles may be collected in a container and then dumped onto the loading platform 36 for subsequent passage through the channels 23. Obviously, during the dumping approximately half of the articles will fall on the platform with their open mouths facing downwardly so that they will be retained in unoccupied cavities 22 during their subsequent passage through the various channels 23.

As a succession of cup-shaped articles 13 is advanced rapidly along a channel 23 by continued vibration of the mechanism 31, each successive correctly oriented article will occupy and be retained in the pocket formed between a pin 24 and the wall surrounding a recess 26, in particular the recess formed at the top of the next cavity 22 forward of the previously forwardmost occupied cavity. Each occupied cavity is traversed by articles advancing over the flat surface 16 of an article 13 seated therein, the seated article, thus, not blocking the continued advance of subsequent articles. Thus, with continued vibration, all of the cavities 22 in the plate 21 will become filled with correctly oriented articles 13 with downwardly facing mouths. This result will occur due to the fact that no incorrectly oriented article is capable of being seated to be retained in the pocket formed at the top of a cavity 22. The base plate 21 obviously serves both as an article support and as a mechanism for selecting articles having a desired orientation from a group of articles having various orientations.

Once all cavities 22 in the plate 21 are occupied by correctly oriented articles 13, vibration is terminated. The valve 38 has preferably already been positioned so as to connect all of the annular passageways 28 in fluid communication with the fluid line 43 which leads to the source 46 of fluid at reduced pressure. Thus, the articles 13 are positively retained in seated position with the mouths 17 thereof opening into the cavities 22 and toward the pins 24. This positive retention is caused by application of vacuum to the lower surfaces of the articles 13, providing a pressure differential across the articles. The effect is maintainable even upon invention of the plate 21, due to the substantial fluid seal provided by the article 13 and the rim 18 substantially filling the pocket in which it is retained.

The plate 21 is now inverted overt the fixture 11 and the cavities 22 in the plate are vertically aligned with the nests 12 in the fixture. When the plate 21 is placed on the fixture 11, the shoulder 32 may be abutted against an edge of the fixture 11 to assist and insure the alignment of the cavities 22 with the nests 12. In the alternative, suitable guide pins extending through bores formed in the fixture 11 and the orienting plate 21 may be used to insure the alignment of the cavities 22 with the nests 12. The valve 38 is then repositioned to connect the conduit 42 to the fluid line 44 which opens to atmosphere. This releases the fluid pressure differential across the articles 13. The articles, thus, are no longer retained in the cavities 22, but drop into position in the nests 12 in the fixture 11.

All of the nests 12 in the fixture may thus be filled simultaneously with cup-shaped articles 13. All of the articles 13 will have the mouths thereof facing upwardly in the desired orientation shown for the two articles 13 depicted in FIG. 1. The plate 21 may thereafter be removed from above the filled fixture 11 to be reused for transferring correctly oriented articles to another fixture 11.

It is to be understood that the above-described apparatus is simply illustrative of one embodiment of the invention. Many modications may be made without departing from the invention.

What is claimed is:

1. In apparatus for selecting articles having a predetermined orientation from a group of randomly oriented articles:

a support for the randomly oriented articles, said support including means for guiding the articles along a predetermined path of travel and a plurality of asymmetrically shaped apertures extending beneath said predetermined path of travel with each aperture being symmetrically shaped except for an elongated slope extending gradually upwardly in a downstream direction along said predetermined path of travel to form a downstream end of the aperture;

means for advancing the randomly oriented articles along said downstream direction on the support to be directed along said predetermined path by the guiding means; and means, extending upwardly within each aperture and shaped to cooperate both with the symmetrical portion of the aperture to define a pocket therewith and with the asymmetrical elongated slope portion of the aperture to define a downstream exit passage extending outwardly therefrom, for seating to capture in said pocket only an advancing article having the predetermined orientation while not so seating an advancing article not having the predetermined orientation and for directing and assisting the advancing article not having the predetermined orientation outwardly from the aperture along said downstream exit passage to continue to advance along said predetermined path of travel.

2. In apparatus for selecting articles having a predetermined orientation, as set forth in claim 1, said articles being cup-shaped so as to each have a single mouth portion:

said seating and directing means including a generally upwardly projecting member shaped to enter the mouth portion of an article disposed only in the predetermined orientation to seat the article within the aperture.

3. In apparatus for selecting articles having a predetermined orientation, as set forth in claim 1:

each of said apertures and seating and directing means having a shape so as to closely surround a seated article; and means establishing a pressure differential across each aperture of insufficient magnitude to retain in the aperture an article not having the predetermined orientation for retaining by the pressure differential a seated article closely surrounded within the aperture, said means establishing a pressure differential of sufficient magnitude to retain therein the seated article upon an inversion of the support.

4. Apparatus for loading cup-shaped articles into a fixture, wherein each article has a mouth defined by a circular wall extending perpendicularly to a central base and wherein said fixture has a plurality of nests arrayed in rows for receiving articles with the mouths of the cups facing upwardly in the nests, the apparatus comprising:

- a plate having a plurality of cavities located therein arrayed in rows and so positioned that inversion of said plate above the fixture will position one cavity over each nest, each of said cavities formed of a circular bore in said plate having a diameter smaller than the outer diameter of a cup-shaped article and a circular recess constituting an upper portion of said cavity with a diameter slightly larger than the outer diameter of a cup-shaped article and with a depth slightly greater than the height of the circular wall of the articles;
- a pair of side walls extending from said plate and bounding each row of cavities to guide articles along said row of cavities;
- means for advancing articles in a forward direction to move along said rows of cavities between said side walls;
- a plurality of slightly inclined exit slopes, one positioned at a forward end of each cavity and extending forwardly therefrom and upwardly from a level spaced beneath the top of said recess by a distance substantially equal to the thickness of the central base of a cup-shaped article;
- a pin having an outer diameter less than an inner diameter of the circular wall of an article and projecting upwardly within each cavity to terminate within said circular recess portion of said cavity with a top surface of said pin spaced below the top of said recess by a distance substantially equal to the thickness of the central base of a cup-shaped article so that an article with a downwardly facing mouth will seat in a retained position within said cavity with said top surface of said pin extending upwardly into the downwardly facing mouth of the article;
- each pin and an inner wall bounding said circular bore portion of each cavity defining therebetween an annular passageway in fluid communication with an article retained seated on said pin;
- a source of fluid having a pressure below ambient pressure; and
- means for selectively communicating said annular passageway alternatively between (1) said source of fluid for retaining the articles seated in said cavities on said pins upon subsequent inverting of said plate over the fixture and (2) ambient fluid pressure for releasing the cup-shaped articles from said cavities in said plate and into the nests in the fixture with the mouths of the cups facing upwardly.

References Cited
UNITED STATES PATENTS

| | | | |
|---|---|---|---|
| 2,143,518 | 1/1939 | Kolin | 214—1 |
| 2,355,643 | 8/1944 | Grover | 214—1 |
| 3,299,502 | 1/1967 | Wanesky | 29—464 X |
| 3,391,805 | 1/1968 | Baden. | |

GERALD M. FORLENZA, Primary Examiner

FRANK E. WERNER, Assistant Examiner

U.S. Cl. X.R.

214—1; 294—64